(12) United States Patent
Meegan

(10) Patent No.: US 8,533,015 B2
(45) Date of Patent: Sep. 10, 2013

(54) METHOD AND SYSTEM FOR CREATING ELECTRONIC BUSINESS REFERRALS WITH CLOUD COMPUTING

(76) Inventor: Dennis Meegan, Chicago, IL (US)

( * ) Notice: Subject to any disclaimer, the term of this patent is extended or adjusted under 35 U.S.C. 154(b) by 20 days.

(21) Appl. No.: 13/223,710

(22) Filed: Sep. 1, 2011

(65) Prior Publication Data

US 2013/0060591 A1 Mar. 7, 2013

(51) Int. Cl.
*G06Q 10/00* (2012.01)
(52) U.S. Cl.
USPC ............................ 705/7; 705/2; 705/3; 705/14
(58) Field of Classification Search
USPC ................................................ 705/2, 3, 7, 14
See application file for complete search history.

(56) References Cited

U.S. PATENT DOCUMENTS

| | | | |
|---|---|---|---|
| 8,185,407 B2 * | 5/2012 | Brimdyr | 705/2 |
| 8,271,326 B1 * | 9/2012 | Brunet et al. | 705/14.16 |
| 8,363,806 B2 | 1/2013 | Bookstaff | |
| 2005/0119937 A1 | 6/2005 | Estes | |
| 2006/0212355 A1 * | 9/2006 | Teague et al. | 705/14 |
| 2007/0083403 A1 * | 4/2007 | Baldwin et al. | 705/7 |
| 2007/0255586 A1 | 11/2007 | Green | |
| 2007/0265921 A1 * | 11/2007 | Rempe et al. | 705/14 |
| 2008/0052110 A1 * | 2/2008 | Ruggirello et al. | 705/2 |
| 2008/0167946 A1 * | 7/2008 | Bezos et al. | 705/10 |
| 2008/0228813 A1 * | 9/2008 | Weiss et al. | 707/103 X |
| 2009/0234730 A1 * | 9/2009 | Lee | 705/14 |
| 2009/0299907 A1 * | 12/2009 | Cofano et al. | 705/80 |
| 2010/0006652 A1 * | 1/2010 | McDonald | 235/487 |
| 2010/0180186 A1 * | 7/2010 | Skinner et al. | 715/205 |
| 2010/0268632 A1 | 10/2010 | Rosenthal et al. | |
| 2011/0208710 A1 | 8/2011 | Lesavich | |
| 2011/0301982 A1 * | 12/2011 | Green et al. | 705/3 |
| 2012/0084665 A1 | 4/2012 | Bookstaff | |
| 2012/0185307 A1 | 7/2012 | Bookstaff | |
| 2012/0278622 A1 | 11/2012 | Lesavich et al. | |

* cited by examiner

*Primary Examiner* — Nga B. Nguyen
(74) *Attorney, Agent, or Firm* — Lesavich High-Tech Law Group, P.C.; Stephen Lesavich

(57) ABSTRACT

A method and system for creating electronic business referrals with cloud computing. Existing clients, customers or patient of a provider of professional services request a unique referral identifier tracking code (e.g., a unique QR code, etc.). The unique referral identifier tracking code is used by others as an automatic referral method to automatically schedule and appointment at a provider of the professional services, automatically record a referral discount for fee charged by the provider of the professional services and automatically record a referral credit for the existing client, customer or patient at provider of the professional services. The automatic referral method is completed with an electronic referral application in a cloud computing application when the unique referral identifier tracking code is received anywhere on a cloud computing network using less bandwidth and less processing cycles via the cloud communications network than via a non-cloud communications network.

20 Claims, 12 Drawing Sheets

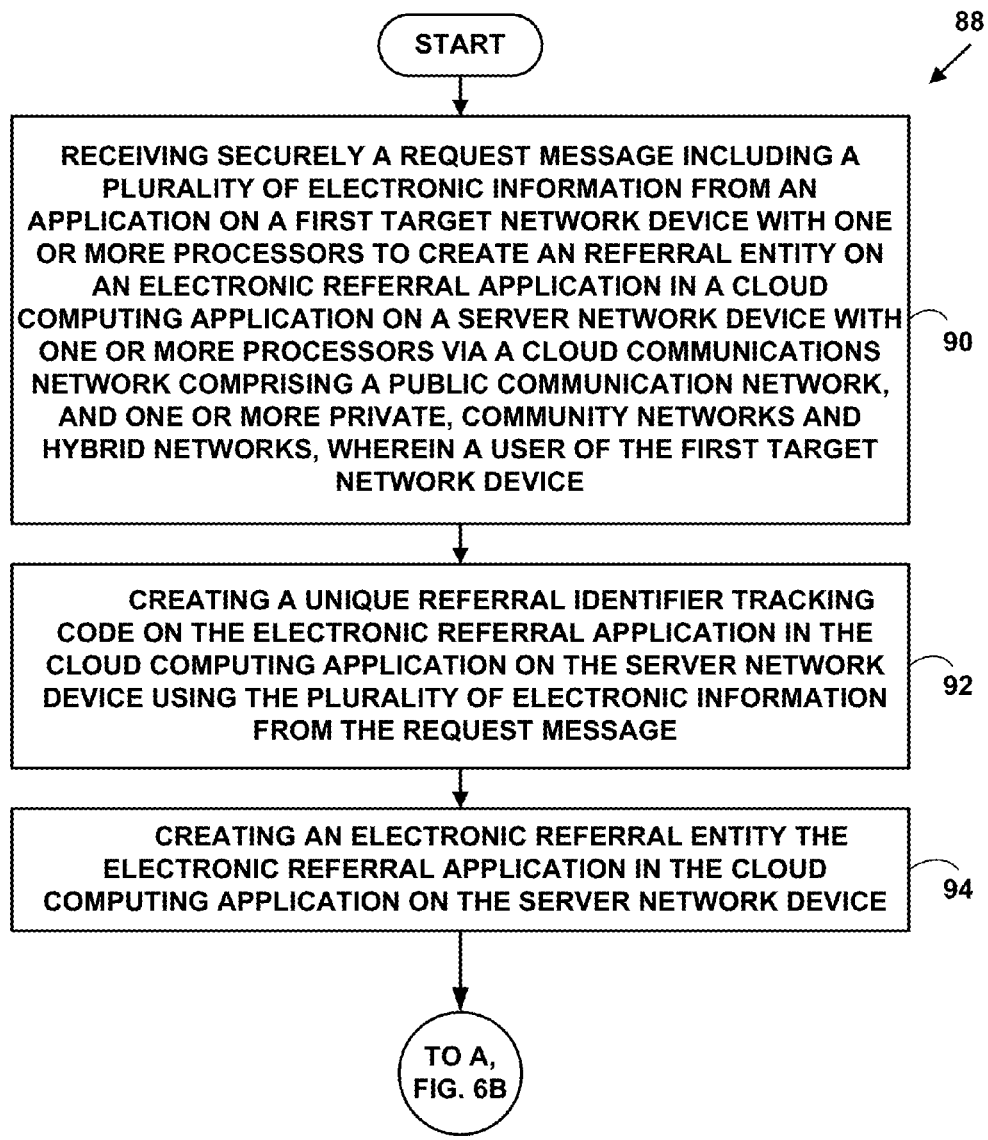

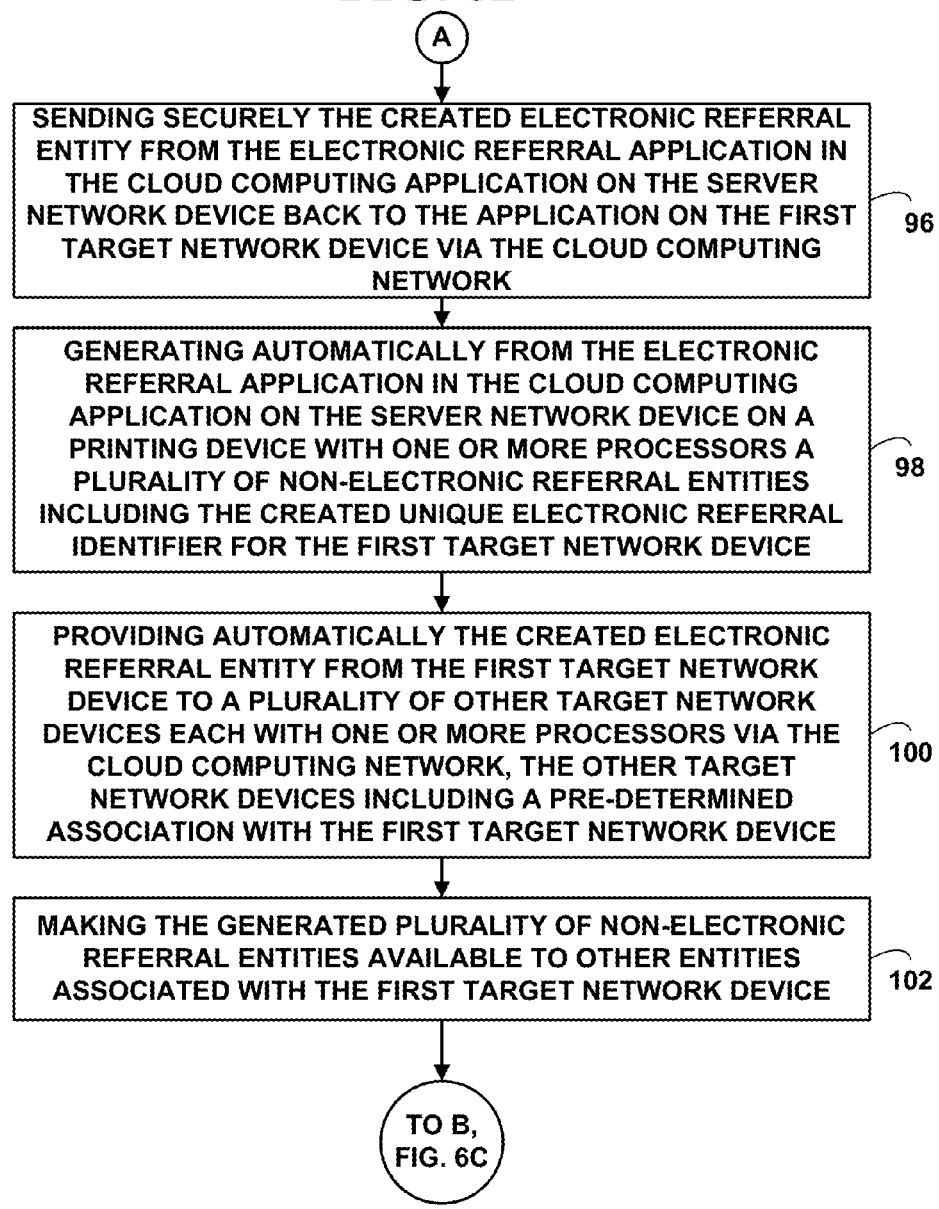

FIG. 6C

ALLOWING THE CREATED UNIQUE REFERRAL IDENTIFIER TRACKING CODE FROM THE CREATED ELECTRONIC REFERRAL ENTITY AND THE PLURALITY OF NON-ELECTRONIC REFERRAL ENTITIES TO BE USED BY ANOTHER TARGET NETWORK DEVICE WITH ONE OR MORE PROCESSORS TO AUTOMATICALLY SCHEDULE AN APPOINTMENT AT A PROVIDER OF PROFESSIONAL SERVICES AND AUTOMATICALLY RECORD A REFERRAL DISCOUNT FOR FEE CHARGED BY THE PROVIDER OF THE PROFESSIONAL SERVICES AND AUTOMATICALLY RECORD A REFERRAL CREDIT FOR THE FIRST TARGET NETWORK DEVICE AT PROVIDER OF THE PROFESSIONAL SERVICES FROM THE ELECTRONIC REFERRAL APPLICATION IN THE CLOUD COMPUTING APPLICATION ON THE SERVER NETWORK DEVICE WHEN RECEIVED VIA ANYWHERE ON THE CLOUD COMPUTING NETWORK USING LESS BANDWIDTH AND LESS PROCESSING CYCLES VIA THE CLOUD COMMUNICATIONS NETWORK THAN VIA A NON-CLOUD COMMUNICATIONS NETWORK ⸺ 104

END

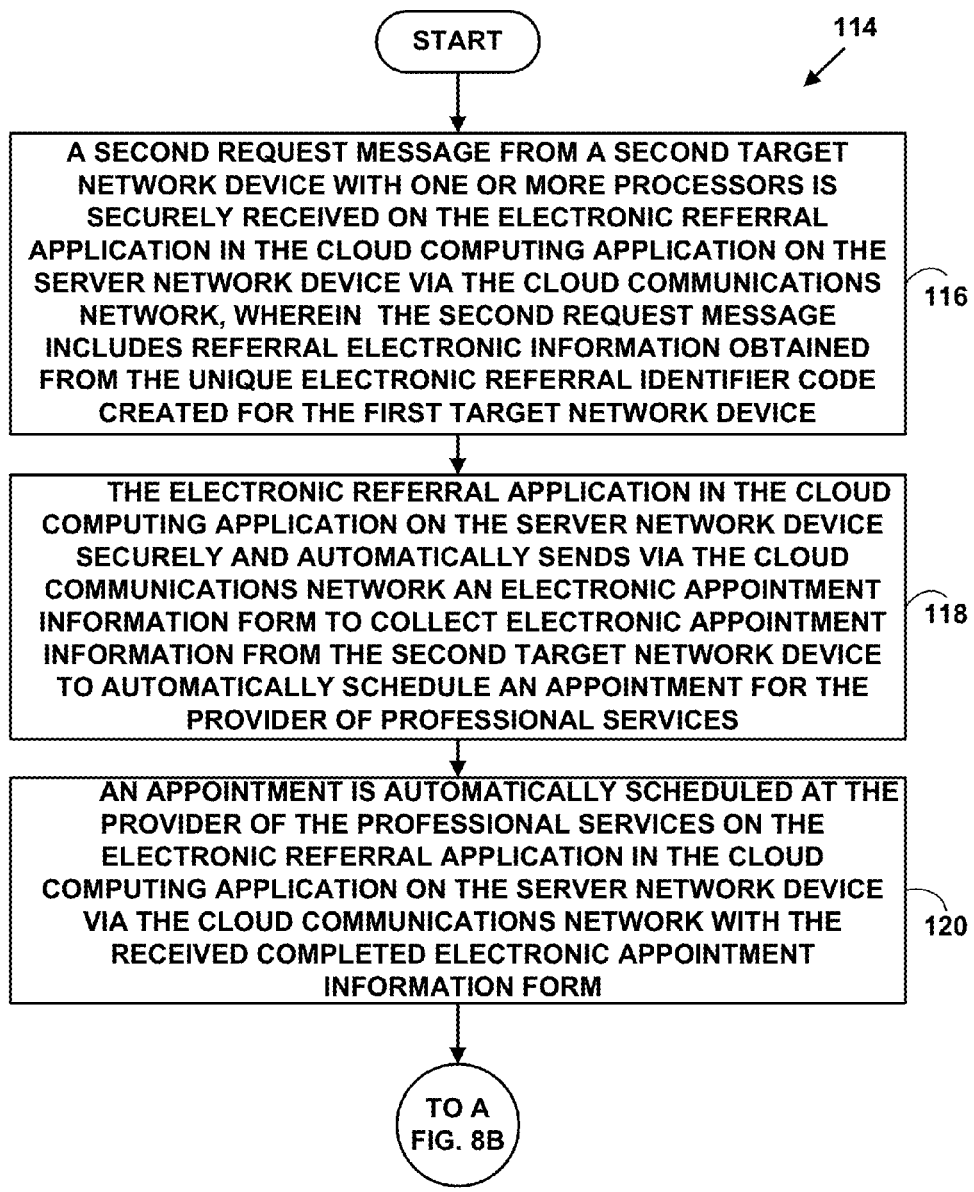

FIG. 8B

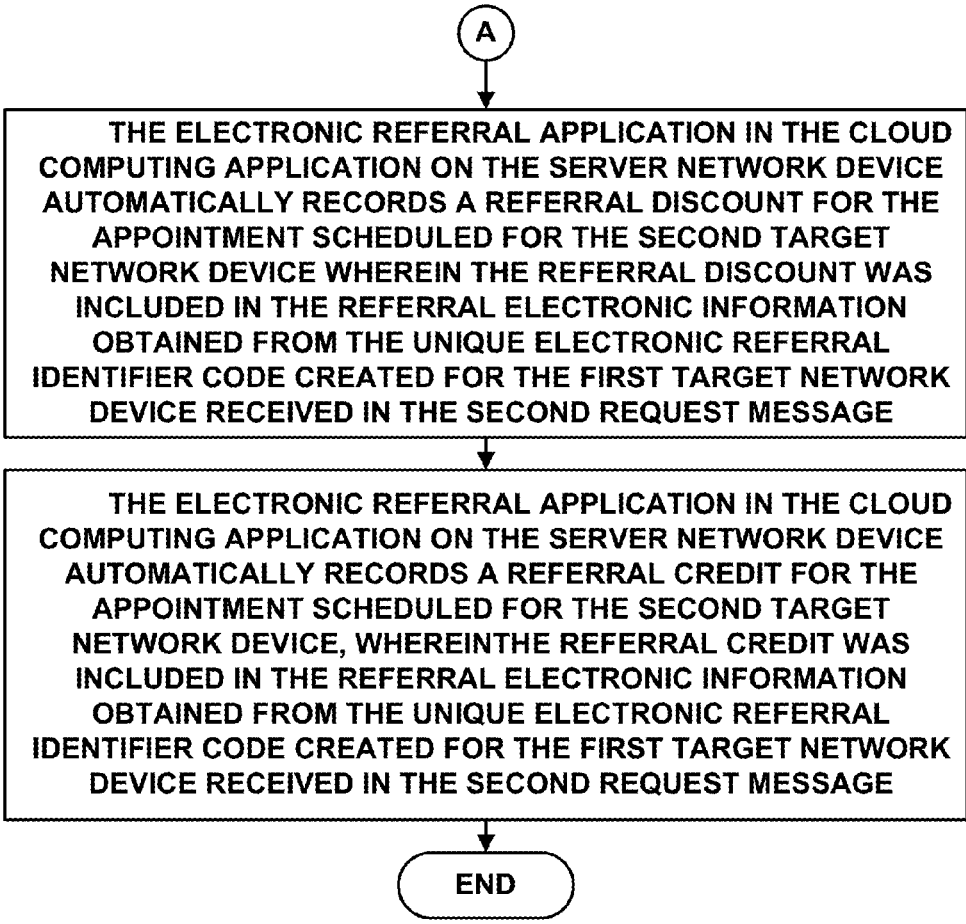

```
THE ELECTRONIC REFERRAL APPLICATION IN THE CLOUD
COMPUTING APPLICATION ON THE SERVER NETWORK DEVICE
AUTOMATICALLY RECORDS A REFERRAL DISCOUNT FOR THE
APPOINTMENT SCHEDULED FOR THE SECOND TARGET
NETWORK DEVICE WHEREIN THE REFERRAL DISCOUNT WAS
INCLUDED IN THE REFERRAL ELECTRONIC INFORMATION
OBTAINED FROM THE UNIQUE ELECTRONIC REFERRAL
IDENTIFIER CODE CREATED FOR THE FIRST TARGET NETWORK
DEVICE RECEIVED IN THE SECOND REQUEST MESSAGE
```
— 122

```
THE ELECTRONIC REFERRAL APPLICATION IN THE CLOUD
COMPUTING APPLICATION ON THE SERVER NETWORK DEVICE
AUTOMATICALLY RECORDS A REFERRAL CREDIT FOR THE
APPOINTMENT SCHEDULED FOR THE SECOND TARGET
NETWORK DEVICE, WHEREINTHE REFERRAL CREDIT WAS
INCLUDED IN THE REFERRAL ELECTRONIC INFORMATION
OBTAINED FROM THE UNIQUE ELECTRONIC REFERRAL
IDENTIFIER CODE CREATED FOR THE FIRST TARGET NETWORK
DEVICE RECEIVED IN THE SECOND REQUEST MESSAGE
```
— 124

END

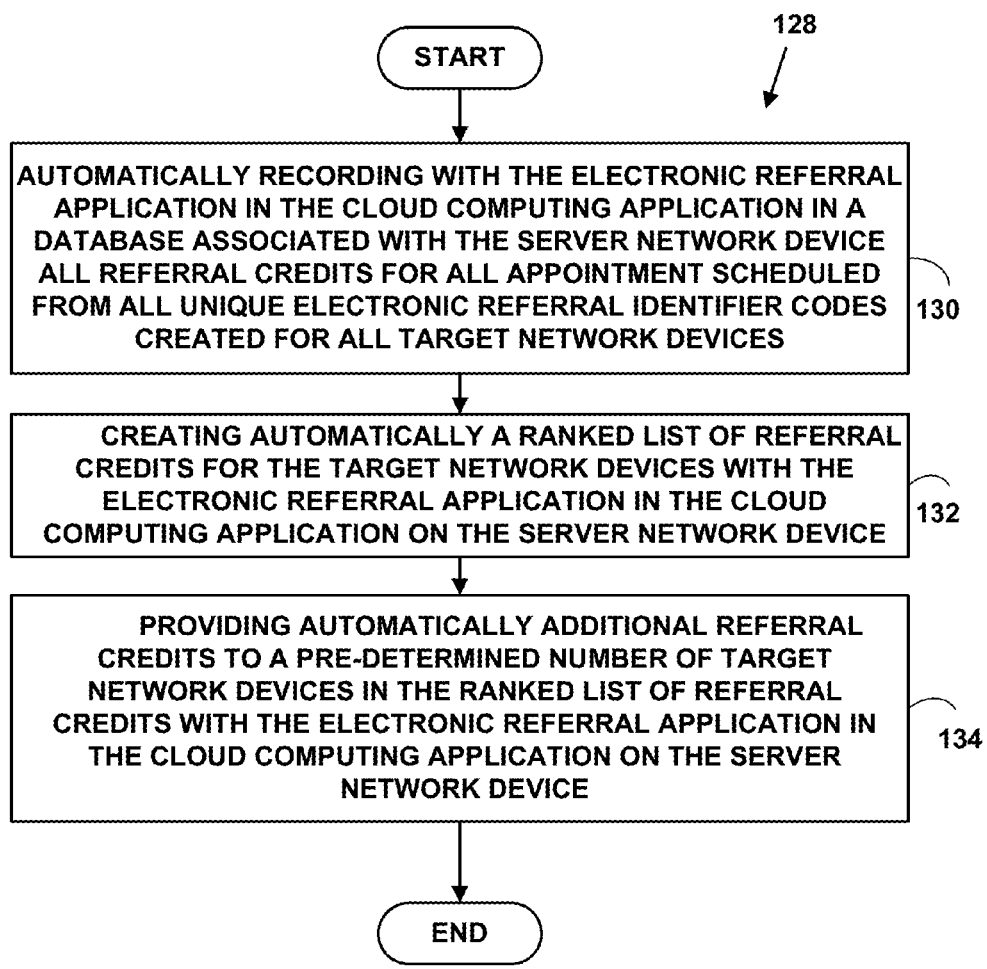

METHOD AND SYSTEM FOR CREATING ELECTRONIC BUSINESS REFERRALS WITH CLOUD COMPUTING

FIELD OF THE INVENTION

This invention relates to providing electronic search information over a computer network. More specifically, it relates to a method and system for creating electronic business referrals with cloud computing.

BACKGROUND OF THE INVENTION

Increasing a client, customer or patient base for an existing provider of professional services (medical, legal, accounting, etc.) is difficult. Significant amounts of resources are spent on advertising and other activities to try and entice new clients, customers or patients to make appointments for professional services.

There have been attempts to solve some of the problems associated with electronic referrals. For example, U.S. Published Application No. 20080052110A1 published by Ruggirello teaches "A referral service system includes a user interface receiving, at a service location of a service provider, information identifying a referred entity. The service provider is a specialist or general practitioner in a professional field or trade that involves routinely rendering non-referral related services to persons seeking those services, and routinely evaluating the persons to determine need for referral to another service provider. A referral record output module generates a referral record and electronically communicates the referral record to a referee, wherein the referral record includes at least information identifying a referrer, the information identifying the referred entity, and information identifying the referee. A referee location indication module generates an indication of a location of the referee at which the referred entity can obtain services provided by the referee, and communicates the indication of the location of the referee to the referred entity."

U.S. Published Application No. 20070255586A1 published by Green teaches "An exemplary method for determining the appropriateness of service provider claims for payment includes scheduling appointments for patients with service providers based on requests for services, generating appointment information corresponding to each of the scheduled appointments, and capturing service information corresponding to claims received from the service providers for payment of charges associated with services rendered by the service providers to the patients. The method further includes automatically identifying candidate appointments that correspond to a particular received claim based on a degree of similarity between the service information associated with the particular received claim and the appointment information associated with the scheduled appointments. Additionally, the method includes flagging the particular received claim for resolution when none of the candidate appointments corresponds to the particular received claim, and presenting the particular received claim for payment when at least one of the candidate appointments corresponds to the particular received claim.

U.S. Published Application No. 20070083403A1 published by Baldwin teaches" A referral information communication and management method, apparatus and system, with related computer-readable media, signals, data-structures and program codes, involving, in response to signals received from respective client computers associated with a referrer and referee of a referral from the referrer to the referee: (1) storing information pertaining to the referral in a database as a collection of linked information units, the information units including a referrer identifier identifying the referrer as originator of the information and a referee identifier identifying the referee as intended recipient of the information, the collection representing the referral and being accessible by the respective client computers; (2) identifying collections of information units that satisfy a criterion, and displaying corresponding identifications at one of the client computers; (3) causing at least one information unit in a collection corresponding to a displayed identification, to be displayed at the client computer; and (4) causing at least one information unit in a collection corresponding to a displayed identification, to be modified."

U.S. Published Application No. 20050119937A1 published by Estes teaches "A method and system for generating and managing referrals is provided. Specifically, a system is provided for rewarding an originator of a referral which results in participation by the recipient of the referral in a defined event. The system employs various messaging events to encourage referrals from an originator of referrals and participation by the recipients of the referrals in a defined event."

However, none of these solutions solves all of the problems associated with electronic referrals. Thus, it is desirable to use existing clients, customers or patients who are happy with a provider of a professional service to refer new clients, customers or patients.

SUMMARY OF THE INVENTION

In accordance with preferred embodiments of the present invention, some of the problems with supplying multiple types of electronic information are overcome. A method and system for creating electronic business referrals is presented.

Existing clients, customers or patient of a provider of professional services request a unique referral identifier tracking code (e.g., a unique QR code, etc.). The unique referral identifier tracking code is used by others as an automatic referral method to automatically schedule and appointment at a provider of the professional services, automatically record a referral discount for fee charged by the provider of the professional services and automatically record a referral credit for the existing client, customer or patient at provider of the professional services. The automatic referral method is completed with an electronic referral application in a cloud computing application when the unique referral identifier tracking code is received anywhere on a cloud computing network using less bandwidth and less processing cycles via the cloud communications network than via a non-cloud communications network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 6A, 6B and 6C are a flow diagram illustrating a method for providing electronic business referrals with cloud computing;

FIGS. 8A and 8B are a flow diagram illustrating a method for providing electronic business referrals with cloud computing; and FIG. 9 is a flow diagram illustrating a method for providing electronic business referral with cloud computing.

DETAILED DESCRIPTION OF THE INVENTION

Figure 1:
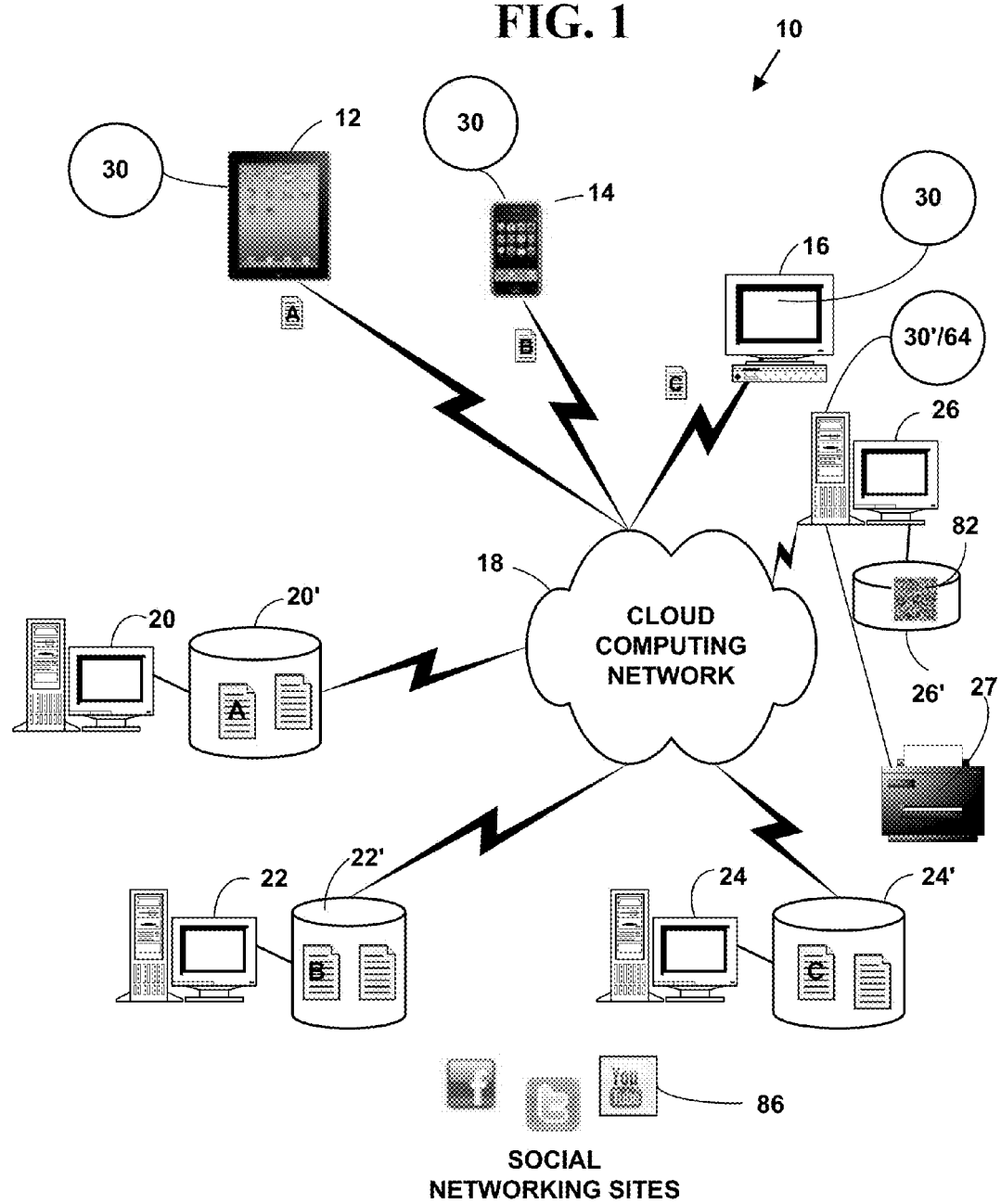
FIG. 1 is a block diagram illustrating an exemplary electronic information display system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and a computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV) set-top boxes, digital televisions including high definition television (HDTV), three-dimensional (3D) televisions and other types of network devices.

The one or more smart network devices 12, 14, 16 also include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more smart network devices 12, 14, 16 also include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a cloud communications network 18 via one or more wired and/or wireless communications interfaces. The cloud communications network 18 includes, but is not limited to, communications over a wire connected to the target network devices, wireless communications, and other types of communications using one or more communications and/or networking protocols. In one embodiment, the cloud communications network 18 also includes a cloud communications network 19.

Plural server network devices 20, 22, 24, 26 (only four of which are illustrated) each with one or more processors and a computer readable medium include one or more associated databases 20', 22', 24', 26'. The plural network devices 20, 22, 24, 26 are in communications with the one or more target devices 12, 14, 16 via the cloud communications network 18.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc. The plural server network devices 20, 22, 24, 26 include one or more printing devices 27 (only one of which is illustrated) each including one or more processors.

The cloud communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN), a cloud communications network 26 and other types of wired and/or wireless communications networks 18.

The cloud communications network 18 may include one or more gateways, routers, bridges and/or switches As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Exemplary Information Display System

Figure 2:
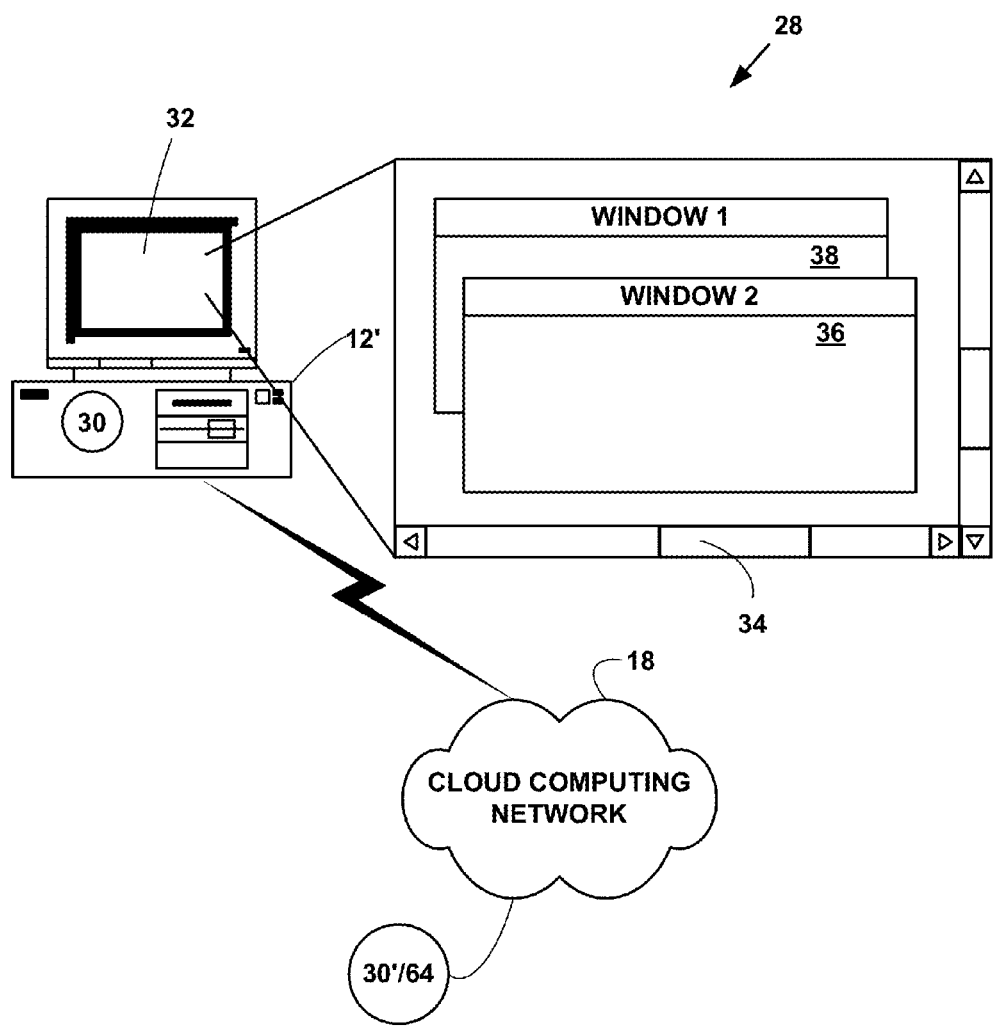
FIG. 2 is a block diagram illustrating an exemplary electronic information display system.

FIG. 2 is a block diagram illustrating an exemplary electronic information display system 28. The exemplary electronic information system display system includes, but is not limited to a target network device (e.g., computer 12', etc.) with an application 30 executing in a computer readable on and a display component 32. The application 30 presents a graphical user interface (GUI) 34 on the display 32 component. The GUI 32 presents a multi-window 36, 38, interface to a user.

In one embodiment of the invention, the application 30 is a software application. However, the present invention is not limited to this embodiment and the application 30 can be hardware, firmware, hardware and/or any combination thereof. In one embodiment, the electronic referral application 30/30' is included in a cloud computing application 64. In another embodiment, the electronic referral application 30 includes a smart phone application for a smart phone 14 or a tablet computer 12. However, the present invention is not limited these embodiments and other embodiments can be used to practice the invention In another embodiment, a portion of the application 30 is executing on the target network devices 12, 14, 16 and another portion of the application 30'/62 is executing on the server network devices 20, 22, 24, 26 However, the present invention is not limited these embodiments and other embodiments can be used to practice the invention.

Exemplary Networking Protocol Stack

Figure 3:
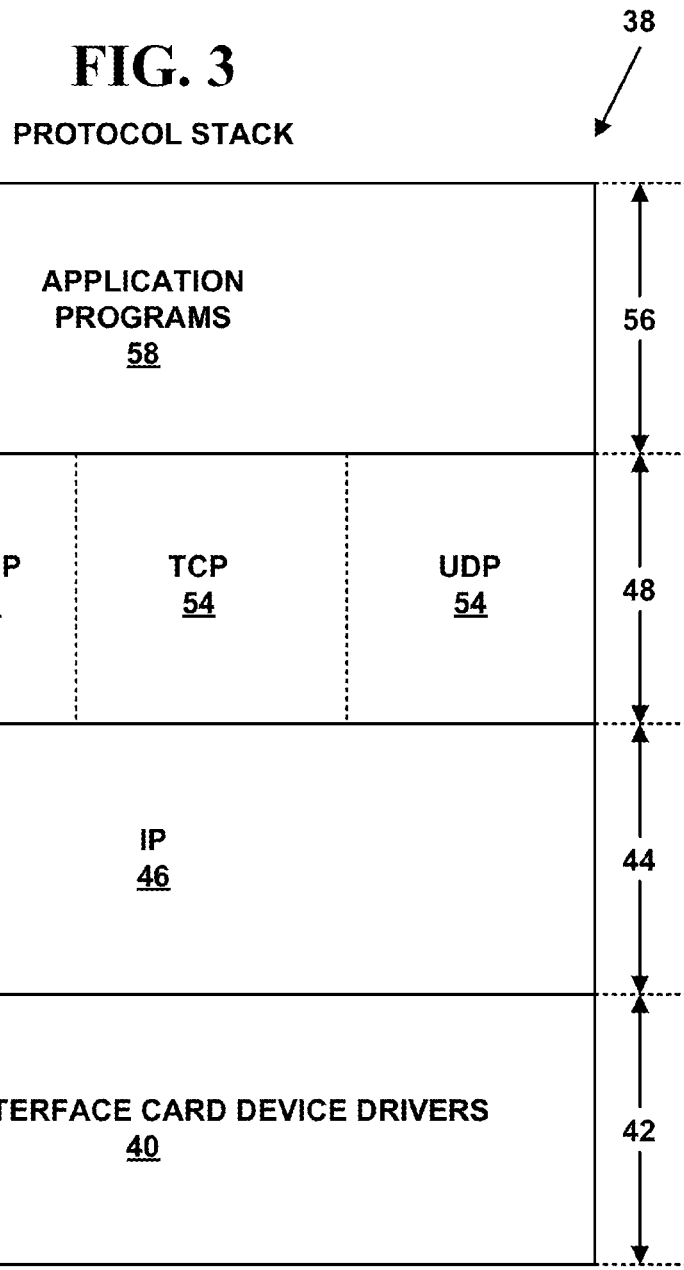
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26 are connected to the communication network 18 with Network Interface Card (NIC) device drivers 40 in a link layer 42 for the actual hardware connecting the network devices 12, 14, 16, 20, 22, 24, 26 to the cloud communications network 18. For example, the NIC device drivers 40 may include a serial port device driver, a modem device driver, an Ethernet device driver, a wireless device driver, a wired device driver, etc. The device drivers interface with the actual hardware being used to connect the network devices to the cloud communications network 18.

Above the link layer 42 is a network layer 44 (also called the Internet Layer for Internet Protocol suites). The network layer 44 includes, but is not limited to, an IP layer 46. As is known in the art, IP 46 is an addressing protocol designed to route traffic within a network or between networks. However, more fewer or other protocols can also be used in the network layer 44, and the present invention is not limited to IP 46.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 56 where application programs 58 (e.g., 30, 62 etc.) to carry out desired functionality for a network device reside. For example, the application programs 54 for the client network devices 12, 14, 16 may include a web-browsers or other application programs, cloud application programs 62, while application programs for the server network devices 20, 22, 24, 26 may include other application programs (e.g., 30', 62, etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for electronic referrals. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs and multi-carrier transmission NICs. However, the present invention is not limited to this embodiment and 1G, 2G and 3G and/or any combination thereof, with or with 4G NICs can be used to practice the invention.

Cloud Computing Networks

In one embodiment, the cloud computing network includes a cloud communications network 18 comprising plural different networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

Figure 4:
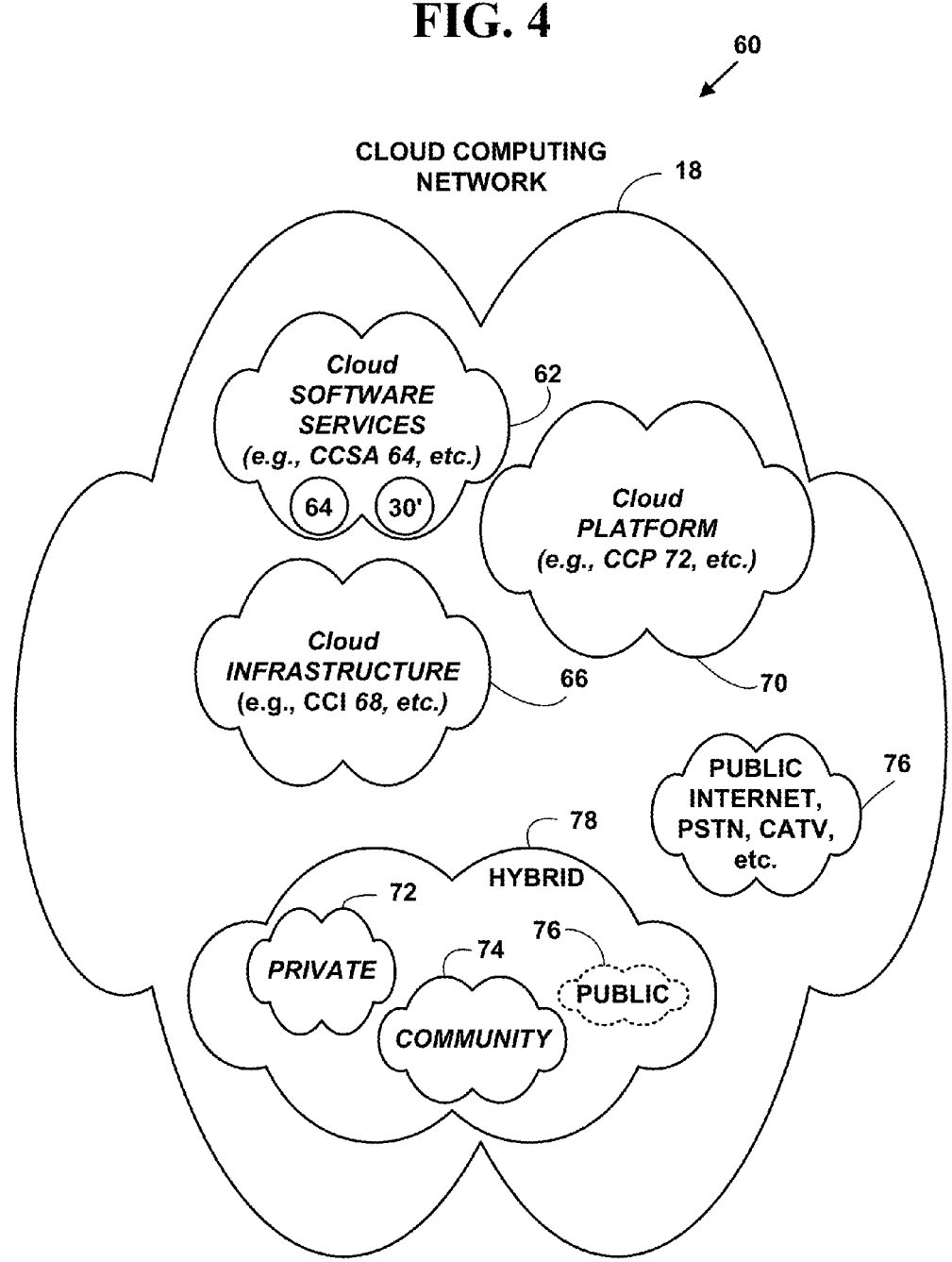
FIG. 4 is block diagram illustrating an exemplary cloud communications network.

FIG. 4 is a block diagram 60 illustrating an exemplary cloud communications network 18. However, the present invention is not limited to this cloud computing model and other cloud computing models can also be used to practice the invention. The exemplary cloud communications network includes both wired and/or wireless components of public and private networks.

This exemplary cloud computing model for electronic referrals promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand electronic referral services. An electronic referral can unilaterally provision computing capabilities, such as server time and network storage, as needed automatically without requiring human interaction with each network server on the cloud communications network 18.
Broadband network access. Electronic referral capabilities are available over plural broadband communications networks and accessed through standard mechanisms that promote use by heterogeneous thin or thick client platforms (e.g., mobile phones, smart phones 14, tablet computers 12, laptops 12', PDAs, etc.). The broadband network access includes high speed network access such as 3G and/or 4G wireless and/or wired and broadband and/or ultra-broad band (e.g., WiMAX, etc.) network access.
Resource pooling. Electronic referral computing resources are pooled to serve multiple electronic referrers using a multi-tenant model, with different physical and virtual resources dynamically assigned and reassigned according to electronic referral demand. There is a sense of location independence in that the electronic referrer generally has no control or knowledge over the exact location of the provided electronic referral resources but may be able to specify location at a higher level of abstraction (e.g., country, state, or datacenter). Examples of pooled TABLE 1-continued resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale in for electronic referrals. To the electronic referrer, the electronic referral capabilities available for provisioning appear to be unlimited and can be used in any quantity at any time.
Measured Services. Cloud computing systems automatically control and optimize resource use by leveraging a metering capability at some level of abstraction appropriate to the type of electronic referrals (e.g., storage, processing, bandwidth, custom electronic referral systems, etc.). Electronic referral usage is monitored, controlled, and reported providing transparency for both the electronic referral service provider and the electronic refer of the utilized electronic referrer service.

Exemplary cloud computing service models illustrated in FIG. 4 appear in Table 2. However, the present invention is not limited to these service models and more, fewer or other service models can also be used to practice the invention.

TABLE 1

Cloud Computing Software Applications 62 for an Electronic Referral Service (CCSA 64). The capability to use the provider's applications 30, 62 running on a cloud infrastructure 66. The cloud computing applications 62, are accessible from the server network device 26 from various client devices 12, 14, 16 through a thin client interface such as a web browser, etc. The user does not manage or control the underlying cloud infrastructure 66 including network, servers, operating systems, storage, or even individual application 30, 62 capabilities, with the possible exception of limited user-specific application configuration settings.
Cloud Computing Infrastructure 66 for the Electronic Referral Service (CCI 68). The capability provided to the user is to provision processing, storage, networks 18, 72, 74, 76, 78 and other fundamental computing resources where the consumer is able to deploy and run arbitrary software, which can include operating systems and applications 30, 62. The user does not manage or control the underlying cloud infrastructure 66 but has control over operating systems, storage, deployed applications, and possibly limited control of select networking components (e.g., host firewalls, etc.).
Cloud Computing Platform 70 for the Electronic Referral Service (CCP 72). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 62 and possibly application hosting environment configurations.

Exemplary cloud computing deployment models appear in Table 2. However, the present invention is not limited to these deployment models and more, fewer or other deployment models can also be used to practice the invention.

TABLE 2

Private cloud network 72. The cloud network infrastructure is operated solely for an electronic referral organization. It may be managed by electronic referral service organization or a third party and may exist on premise or off premise.
Community cloud network 74. The cloud network infrastructure is shared by several different organizations and supports a specific referral community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, CATV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique TABLE 2-continued entities but are bound together by standardized or proprietary technology that enables data and application portability (e.g., cloud bursting for load-balancing between clouds, etc.)

Cloud software 62 for electronic referrals takes full advantage of the cloud paradigm by being service oriented with a focus on statelessness, low coupling, modularity, and semantic interoperability for providing electronic referrals.

Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX (and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX (hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Internet Television Services

In one embodiment, the applications 30', 62 provide television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

Social Networking Services

In one embodiment, the applications 30', 62 provide one more social networking services to/from one or more social networking web-sites (e.g., FACEBOOK, U-TUBE, TWITTER, MY-SPACE, MATCH.COM, E-HARMONY, GROUPON, SOCIAL LIVING, etc.). The social networking web-sites include, but are not limited to, dating web-sites, blogs, RSS feeds, and other types of information web-sites in which messages can be left or posted for a variety of social activities.

However, the present invention is not limited to the social networking services described and other public and private social networking services can also be used to practice the invention.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (domain name) "www.ieee.org." The ITU, (formerly known as the CCITT) standards can be found at the domain name "www.itu.ch." ETSI standards can be found at the domain name "www.etsi.org." IETF standards can be found at the domain name "www.ietf.org." The NIST standards can be found at the domain name "www.nist.gov." The ANSI standards can be found at the domain name "www.ansi.org." Bluetooth Forum documents can be found at the domain name "www.bluetooth.com." WAP Forum documents can be found at the domain name "www.wapforum.org." ADSL Forum documents can be found at the domain name "www.adsl.com."

Security and Encryption

Network devices and/or wired and wireless interfaces of the present invention include security and encryption for secure communications on the cloud communications network 18 and/or cloud communications network 26. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods and more, fewer and/or other types of security and encryption methods can be used to practice the invention.

The electronic referral system 10 provides a method and system to generate and use electronic referrals from existing customers and/or patients and/or clients to generate plural new customers and/or patients and/or clients. The existing customers and/or patients and/or clients receive discounted goods and/or services and/or monetary rewards. The new customers and/or patients and/or clients receive discounted goods and/or services.

Figure 5:
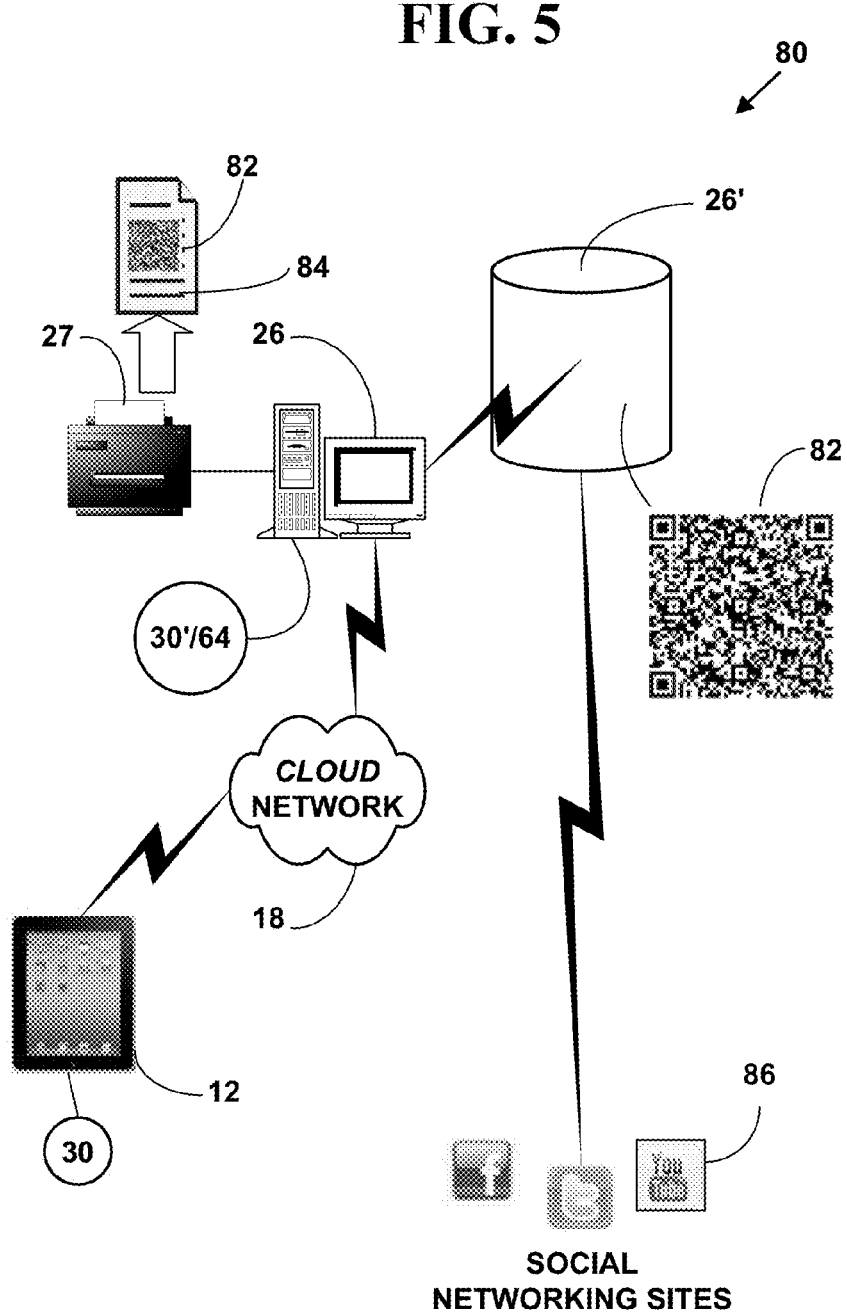
FIG. 5 is a block diagram illustrating an exemplary electronic referral system.

FIG. 5 is a block diagram 80 illustrating additional details of the exemplary electronic referral system 10.

The electronic referral system 10 includes an application 30' and cloud computing application 62 on a server network device (e.g., 26, etc.) in communications with a cloud communications network 18. The server network device 26 accepts referral requests from target network devices (e.g., 14, etc.) via the cloud communications network 18 and generates a unique referral identifier tracking code 82. The electronic referral system 10 also accepts referral requests from plural social networking sites 84 (e.g., FACEBOOK, TWITTER, UTUBE, GROUPON, SOCIAL LIVING etc.) and/or from social networking information (e.g., FACEBOOK updates, TWEETS, etc.) via the cloud communications network 18. The electronic referral system 10 also prints out non-electronic entities 86 including the unique referral identifier tracking code 82 via printing device 27.

Method for Providing Electronic Referrals with Cloud Computing

FIGS. 6A, 6B and 6C are a flow diagram illustrating a Method 88 for providing electronic referrals with cloud computing. In FIG. 6A at step 90, a request message is securely received including a plurality of electronic information from an application on a first target network device with one or more processors to create an referral entity on an electronic referral application in a cloud computing application on a server network device with one or more processors via a cloud communications network comprising a public communication network, and one or more private, community networks and hybrid networks, wherein a user of the first target network device is an existing customer, client or patient of a provider of professional services. At Step 92, a unique referral identifier tracking code is created on the electronic referral application in the cloud computing application on the server network device using the plurality of electronic information from the request message. At Step 94, an electronic referral entity is created the electronic referral application in the cloud computing application on the server network device. In FIG. 6B at Step 96, the created electronic referral entity is securely sent from the electronic referral application in the cloud computing application on the server network device back to the first target network device via the cloud computing network. At Step 98, the created electronic referral entity is provided automatically from the first target network device to plural other target network devices each with one or more processors via the cloud computing network, the other target network devices including a pre-determined association with the first target network device. At Step 100, the electronic referral application in the cloud computing application on the server network device automatically generates on a printing device with one or more processors a plurality of non-electronic referral entities including the created unique electronic referral identifier for the first target network device. At Step 102, the generated plural non-electronic referral entities are made available to other entities associated with the first target network device. In FIG. 6C at Step 104 allowing the created unique referral identifier tracking code from the created electronic referral entity and the plural non-electronic referral entities to be used by another target network device with one or more processors to automatically schedule an appointment at a provider of professional services and automatically record a referral discount for fee charged by the provider of the professional services and automatically record a referral credit for the first target network device at provider of the professional services from the electronic referral application in the cloud computing application on the server network device when received via anywhere on the cloud computing network using less bandwidth and less processing cycles via the cloud communications network than via a non-cloud communications network.

Method 88 is illustrated with an exemplary embodiment. However, the invention is not limited to this embodiment and other embodiments can also be used to practice the invention.

In such an exemplary embodiment in FIG. 6A at step 90, a request message is securely from an application 30 on a first target network device 12 with one or more processors to create an referral entity on an electronic referral application 30' in a cloud computing application 64 on a server network device 26 with one or more processors via a cloud communications network 18 comprising a public communication network 76 (e.g., the Internet), and one or more private 72, community 74 networks and hybrid networks 78. A user of the first target network device is an existing customer, client or patient of a provider of professional services.

In one embodiment the request message includes plural electronic information including, but not limited to, a business name, an existing customer, patient or client name and one or more referral fee amounts, a fee discount amount for a new customer, patient or client referred and a credit fee for the existing customer, patient or client.

The referral entity is used to allow existing customers, patients or clients of the provider of professional services to refer new customers, patient or clients to a provider of professional services.

The provider of the professional services, include, but are not limited to, the medical field such as dental practices, chiropractic practices, podiatry practices, physical therapy practices, optometry and laser eye surgery clinics, plastic surgery practices, other types of medical practices and veterinary practices, etc. Additional professional services such as legal services, accounting and other service-driven business (e.g., automotive repair, construction, (e.g. carpentry, plumbing, etc.), babysitting, etc.). However, the present invention is not limited to the professional services and other professional services and other embodiments may also be used to practice the invention.

In one embodiment, the cloud communications network 18 provides on-demand self-service, broad network access, resource pooling, rapid elasticity and measured electronic services for electronic referrals.

In one embodiment, the server network device 26 includes a wireless networking interface comprising $4^{th}$ generation (4G) Worldwide Interoperability for Microwave Access (WiMax) wireless interface in communications with the cloud communications network 18.

In one embodiment, the cloud computing application 64 includes a cloud electronic referral service CCS, a cloud computing platform CCP 68 for the electronic referral service and a cloud computing infrastructure CCI 72 for electronic referral service.

In one embodiment, the cloud communications network 18 includes on-demand electronic referral services, broadband network access, resource pooling, rapid elasticity and measured network services for electronic referral service services via the components of the cloud computing network 18.

In one embodiment, the secure communications used in Method 88 include using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), and/or a Transport Layer Security (TLS) security method as described above.

However, the present invention is not limited to these embodiments and other embodiments may also be used to practice the invention.

At Step 92, a unique referral identifier tracking code 82 is created on the electronic referral application 30' in the cloud computing application 64 on the server network device 26 using the plural electronic information from the request message.

In one embodiment, the unique referral identifier tracking code includes barcode. A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers, scanners and interpretive software are available on devices including desktop printers and smart phones 14 and tablet computers 12.

Table 3 illustrates exemplary linear barcodes, the standards of all of which are incorporated by reference. However, the present invention is not limited to the exemplary linear barcodes listed in Table 3, and more fewer and other linear barcodes can also be used to practice the invention.

TABLE 3

Linear Bar Codes

U.P.C.
Codabar
Code 25 - Non-interleaved 2 of 5
Code 25 - Interleaved 2 of 5
Code 39
Code 93
Code 128
Code 128A
Code 128B
Code 128C
Code 11
CPC Binary
DUN 14
EAN 2
EAN 5
EAN 8, EAN 13
Facing Identification Mark
GS1-128 (formerly known as UCC/EAN-128), incorrectly referenced as EAN 128 and UCC 128
GS1 DataBar, formerly Reduced Space Symbology (RSS)
HIBC (HIBCC Health Industry Bar Code)
ITF-14
Latent image barcode
Pharmacode
Plessey
PLANET
POSTNET
Intelligent Mail barcode
MSI
PostBar
RM4SCC/KIX
JAN
Telepen Table 4 illustrates exemplary matrix (2D) barcodes, the standards of all of which are incorporated by reference. However, the present invention is not limited to the exemplary matrix barcodes listed in Table 4, and more fewer and other matrix barcodes can also be used to practice the invention.

TABLE 4

Matrix Bar Codes

3-DI
ArrayTag
Aztec Code
Small Aztec Code
Chromatic Alphabet
Codablock
Code 1
Code 16K
Code 49
ColorCode
Compact Matrix Code
CP Code
CyberCode
d-touch
DataGlyphs
Datamatrix
Datastrip Code
Dot Code A
EZcode
Grid Matrix Code
High Capacity Color Barcode
HueCode
INTACTA.CODE
InterCode
JAGTAG
Lorem ipsum
MaxiCode
mCode
MiniCode
MicroPDF417
MMCC
Nintendo e-Reader#Dot code
Optar
PaperDisk
PDF417
PDMark
QR Code
QuickMark Code
SmartCode
Snowflake Code
ShotCode
SPARQCode
SuperCod
Trillcode
UltraCode
UnisCode
VeriCode, VSCode
WaterCode In one specific embodiment, the application 30', 64 interacts with a bar code reader application. However, the present invention is not limited to a bar code reader application and other applications can also be used to practice the invention.

In one specific exemplary embodiment, the unique referral identifier tracking code includes a QR bar code 82 (Also called "Quick Read" bar code). However, the present invention is not limited to QR codes and other types of bar codes can also be used to practice the invention.

A "QR Code" is a specific matrix barcode (or two-dimensional code), readable by dedicated QR barcode readers and camera phones. The code consists of black modules arranged in a square pattern on a white background. The information encoded can be text, URL or other data. QR codes are defined in *ISO/IEC* 18004:2006 *Information technology—Automatic identification and data capture techniques—QR Code* 2005 *bar code symbology specification*, 1 Sep. 2006, the contents of which are incorporated by reference.

Figure 7:
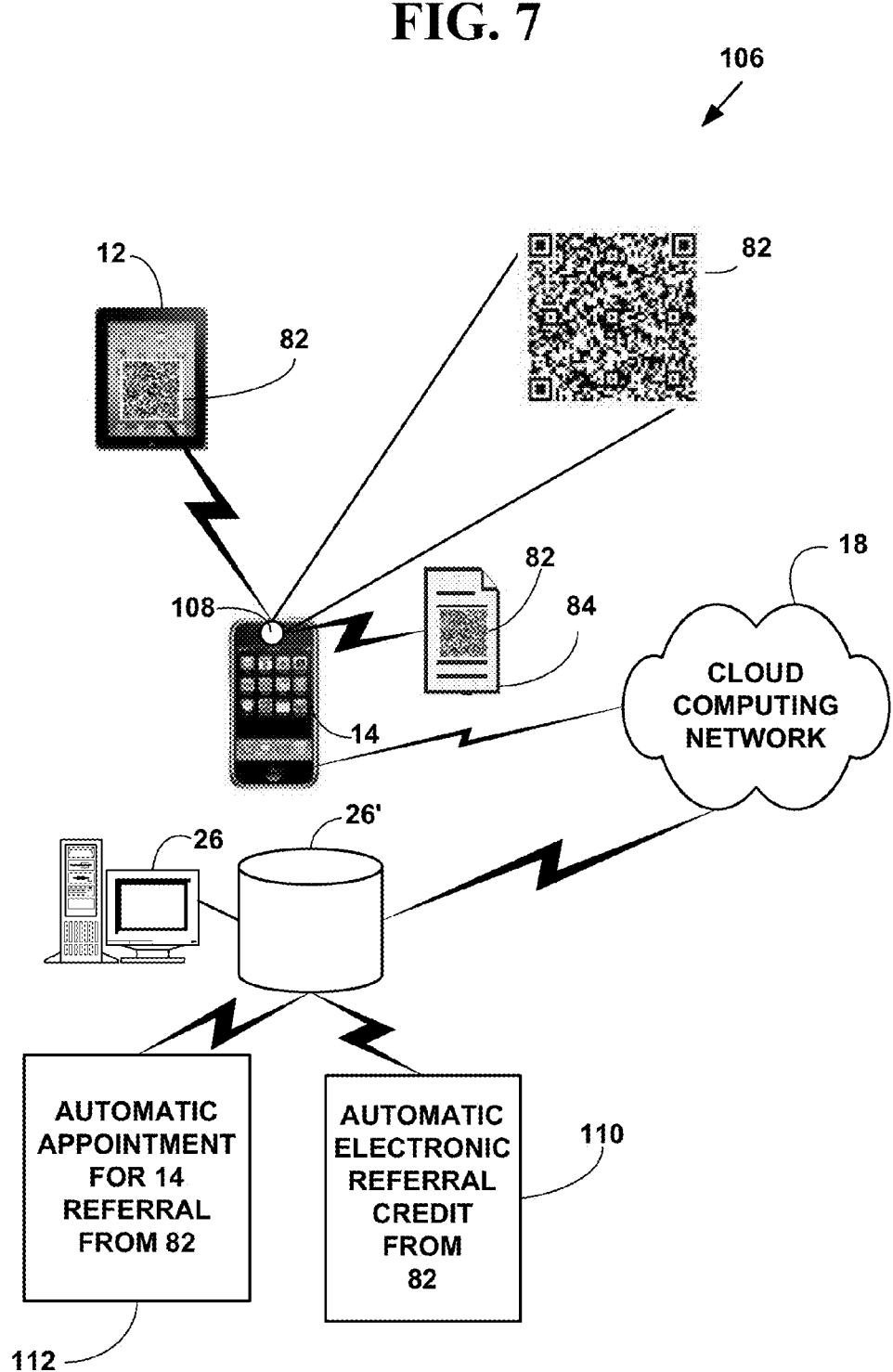
FIG. 7 is a block diagram illustrating further details of the electronic referral business referral system.

FIG. 7 is a block diagram 106 illustrating further details of the electronic referral business referral system for FIGS. 1 and 5.

Users with a camera equipped smart phone 14 (or tablet computer 12, etc.) with a the camera component 108, a bar code reader application appropriate for the bar code processes the digital image of the QR Code 82. The camera component 108 is used to capture existing QR codes from print and electronic advertising 84 and other sources (e.g., from other network devices, etc.) The converts the QR code 87 into appropriate QR codes 82 are also used to display text, contact information, connect to a wireless network, open a web page in the phone's browser or initiate a communications event over the cloud communications network 18 (e.g., voice call, data call, etc.) This act of linking from physical world objects is known as a "hardlink" or "physical world hyperlinks."

For example, Google's smart phone Android operating system supports the use of QR codes by natively including the barcode scanner (e.g., Zxing, etc.) on some models, and the browser supports Uniform Resource Identifier (URI) redirection, which allows QR Codes to send metadata to existing applications on the device. Nokia's Symbian operating system is also provided with a barcode scanner, which is able to read QR codes, while mbarcode is a QR code reader for the Maemo operating system. In the Apple iOS, a QR code reader is not natively included, but hundreds of free applications available with reader and metadata browser URI redirection capability. However, the present invention is not limited to these network device operating systems and other bar code readers and device operating systems can also be used to practice the invention.

In one embodiment, a user may scan a number of QR bar codes 82 from non-electronic information such as post cards, plastic scan cards, magazines, business cards, billboards, other non-electronic advertising, etc. A user may also scan a number of QR bar codes 82 from electronic advertising such from web-sites, other target network devices 14, 16, from e-mails, text messages, instant messages, etc.

However, the present invention is not limited to such unique referral identifier tracking codes and more, fewer and/or other types of unique referral identifier tracking codes can be used to practice the invention.

Encoded in the actual exemplary QR bar code 82 illustrated in FIG. 7 includes electronic information comprising "Dr. Meegan, Meegan Dentistry, Patient Sally Brown, $10 credit for new patient referral, $50 off an initial visit for the new patient and a universal resource locator (URL) to initiate generation of an appointment (e.g., www.meegandentistry.com/appointments)" When a QR bar code reader is used to read the QR bar code 82, this text will be returned.

Table 5 illustrates additional details of actual exemplary QR code 82. However, the present invention is not limited to the exemplary barcode or information listed in Table 5, and more fewer and other QR barcodes and associated information can also be used to practice the invention.

TABLE 5

| | |
|---|---|
|  QR Code 82 | Dr. Megan<br>Meegan Dentistry<br>Patient Sally Brown<br>$10 credit to Sally Brown for a new patient referral<br>$50 of an initial office visit for a new patient<br>www.megandenistry.com/appointment |

One of the advantages of using the QR codes is that unique (and dynamically changeable) information can be encoded for each existing customer, patient or client and at the same time provide a uniform looking referral entity. For example, as is explained below, an existing customer, patient or client may receive additional referral credits as new customers, patients or clients are referred. The QR Code 82 in Table 5 could be easily change to reflect a new referral credit (e.g. $25 credit to Sally Brown, etc.) and it would look very similar to the QR code 82 illustrated, even though the information generated by a QR reading from the QR code 82 would be different.

Returning to FIG. 6A at Step 94, an electronic referral entity is created on the electronic referral application 30' in the cloud computing application 64 on the server network device 26. The electronic referral entity allows the first target network device to send the unique referral identifier tracking code 82 to other target network devices 14, 16 for potential new referrals for the provider of the professional services.

In one embodiment, the electronic referral entity includes only the unique referral identifier tracking code as a unique QR code 82. In another embodiment, the electronic referral entity includes the unique referral identifier tracking code as a unique QR code 82 and additional text instructions and/or other information (e.g., advertising, coupons, etc.). However, the present invention is not limited to these embodiments and other types electronic referral entities can be used to practice the invention.

In one embodiment, the unique referral identifier tracking code 82 includes an expiration date after which referral discounts are no longer given. In another embodiment, the unique referral identifier tracking code 82 includes referral discounts and referral credits that decrease based on a pre-determined method up until an expiration date (e.g., decrease X % a day up until the expiration date, etc.) In such embodiments, a new customer, patient and/or client has an additional incentive to request an appointment from the provider of the professional services.

In FIG. 6B at Step 96, the created electronic referral entity is securely sent from the electronic referral application 30' in the cloud computing application 84 on the server network device 26 back to the first target network device 12 via the cloud computing network 18. An referrals generated by the created electronic referral entity are processed not on the first target network device 12, but instead via one more server network devices (e.g., 26) on one or more different networks in the cloud computing network 18 using less bandwidth and less processing cycles via the cloud communications network 18 than via a non-cloud communications network. This significantly increases the speed and the usability of the electronic referral system 10.

At Step 98, the created electronic referral entity is provided automatically from the first target network device 14 to plural other target network devices 14, 16 each with one or more processors via the cloud computing network 18, the other target network devices 14, 16 including a pre-determined association with the first target network device 12. In such an embodiment, the electronic referral entity is provided via electronic mail, text message, instant message, etc. electronically via the cloud computing network 18.

In another embodiment, the electronic referral entity is provided via wired or wireless communications (e.g., 802.11xx, Bluetooth, Infra, Wi-Fi, WiMAX, TCP/IP, UDP/IP, GSM, etc.)

In one embodiment, the pre-determined association includes a friendship, a business relationship, a personal relationship, etc.

However, the present invention is not limited to these embodiments and other methods may be used to provide the electronic referral entity and other pre-determined associations can also be used to practice the invention.

At Step 100, the electronic referral application 30' in the cloud computing application 62 on the server network device 26 automatically generates on a printing device 27 with one or more processors a plural non-electronic referral entities 84 including the created unique electronic referral identifier 82 for the first target network device.

In one embodiment, the plural non-electronic referral entities 84 include post cards, appointment cards, business cards, magazine advertisement, posters, billboards, plastic cards including swipe cards, etc, other types of non-electronic advertising, etc. However, the present invention is not limited to this embodiment and other types of non-electronic referral entities 84 may also be used to practice the invention.

At Step 102, the generated plural non-electronic referral entities 84 are made available to other entities associated with the first target network device 12. In one embodiment, the plural non-electronic referral entities 84 are made available for personal pick-up and/or for automatic delivery via U.S. mail, express mail, other delivery methods to a user of the first target network device. In such an embodiment, the user then personally distributes the non-electronic referral entities to friends, relatives, associates, etc. However, the present invention is not limited to these embodiments and other embodiments may also be used to practice the invention.

In FIG. 6C at Step 104, the created unique referral identifier tracking code 82 from the created electronic referral entity and the plural non-electronic referral entities 84 are allowed to be used by another target network device 14, 16 with one or more processors to automatically schedule an appointment at a provider of professional services and automatically record a referral discount for fee charged by the provider of the professional services and automatically record a referral credit for the first target network device 12 at provider of the professional services from the electronic referral application 30' in the cloud computing application 62 on the server network device 26 when received via anywhere on the cloud computing network 18 using less bandwidth and less processing cycles via the cloud communications network than via a non-cloud communications network.

In on embodiment, the referral credit is a referral credit for fees charged by the provider of the professional services. In another embodiment, the referral credit is provided as a gift card, gift certificate, pre-paid debit card, cash, etc. However, the present invention is not limited to this embodiment and other types of referral credits may also be used to practice the invention.

In one embodiment, Step 104 includes automatically scheduling an appointment via an electronic form via the cloud communications network 18 and/or automatically via an automatic voice system and/or via an appointment scheduling service with live people. However, the present invention is not limited to this embodiment and other embodiments may also be used to practice the invention.

Automatically Processing Referrals

FIGS. 8A and 8B are a flow diagram illustrating a Method 114 for providing electronic referrals with cloud computing. At Step 116, a second request message from a second target network device with one or more processors is securely received on the electronic referral application in the cloud computing application on the server network device via the cloud communications network. The second request message includes referral electronic information obtained from the unique electronic referral identifier code created for the first target network device. At Step 118, the electronic referral application in the cloud computing application on the server network device securely and automatically sends via the cloud communications network an electronic appointment information form to collect electronic appointment information from the second target network device to automatically schedule an appointment for the provider of professional services. At Step 120, an appointment is automatically scheduled at the provider of the professional services on the electronic referral application in the cloud computing application on the server network device via the cloud communications network with the received completed electronic appointment information form. In FIG. 8B at Step 122, the electronic referral application in the cloud computing application on the server network device automatically records a referral discount for the appointment scheduled for the second target network device. The referral discount was included in the referral electronic information obtained from the unique electronic referral identifier code created for the first target network device received in the second request message. At Step 124, the electronic referral application in the cloud computing application on the server network device automatically records a referral credit for the appointment scheduled for the second target network device. The referral credit was included in the referral electronic information obtained from the unique electronic referral identifier code created for the first target network device received in the second request message.

Method 114 is illustrated with an exemplary embodiment. However, the invention is not limited to this embodiment and other embodiments can also be used to practice the invention.

In such an exemplary embodiment, in FIG. 8A at Step 116, a second request message from a second target network device 14 with one or more processors is securely received on the electronic referral application 30' in the cloud computing application 64 on the server network device 26 via the cloud communications network 18. The second request message includes referral electronic information obtained from the unique electronic referral identifier code (e.g., QR code 82, see Table 7, etc.) created for the first target network device 12. The second target network device 14 uses an appropriate reader to extract and activate the information in the unique electronic referral identifier code (e.g., QR code 82, etc.)

At Step 118, the electronic referral application 30' in the cloud computing application 64 on the server network device 26 securely and automatically sends via the cloud communications network 18 an electronic appointment information form to collect electronic appointment information from the second target network device 14 to automatically schedule an appointment for the provider of professional services.

At Step 120, an appointment is automatically scheduled at the provider of the professional services on the electronic referral application 30' in the cloud computing application 64 on the server network device 26 via the cloud communications network 18 with the received completed electronic appointment information form.

In one embodiment, Step 120 includes automatically scheduling an appointment via an electronic form via the cloud communications network 18 and/or automatically via an automatic voice system and/or via an appointment scheduling service with live people. However, the present invention is not limited to this embodiment and other embodiments may also be used to practice the invention.

At Step 122, with the electronic referral application 30' in the cloud computing application 64 on the server network device 26 automatically records a referral discount for the appointment scheduled for the second target network device 14. The referral discount was included in the referral electronic information obtained from the unique electronic referral identifier code 82 created for the first target network device 12 received in the second request message.

At Step 124, the electronic referral application 30' in the cloud computing application 64 on the server network device 26 automatically records a referral credit for the appointment scheduled for the second target network device 14. The referral credit was included in the referral electronic information obtained from the unique electronic referral identifier 82.

In one embodiment, Method 114 further includes Step 126, automatically generating a gift card or gift certificate or pre-paid debit card (e.g., with printing device 27, via an another service, a retail establishment, an e-commerce web-site, etc.) for an amount of the referral credit with the electronic referral application 30' in the cloud computing application 64 on the server network device 26. However, the present invention is not limited to this embodiment and other embodiments may also be used to practice the invention with of without Step 126.

Automatically Tracking Referrals and Providing Additional Referral Incentives

FIG. 9 is a flow diagram illustrating a Method 128 for providing electronic business referral with cloud computing. At Step 130, the electronic referral application in the cloud computing application automatically records in a database associated with the server network device all referral credits for all appointment scheduled from all unique electronic referral identifier codes created for all target network devices. At Step 132, a ranked list of referral credits for the target network devices is created on electronic referral application in the cloud computing application on the server network device. At Step 134, additional referral credits are automatically applied to a predetermined number of target network devices in the ranked list of referral credits with the electronic referral application in the cloud computing application on the server network device.

Method 128 is illustrated with an exemplary embodiment. However, the invention is not limited to this embodiment and other embodiments can also be used to practice the invention.

In such an exemplary embodiment at Step 130, the electronic referral application 30' in the cloud computing application 64 automatically records in a database 26' associated with the server network device 26 all referral credits for all appointment scheduled from all unique electronic referral identifier codes created for all target network devices 12, 14, 16.

At Step 132, a ranked list of referral credits for the target network devices 12, 14, 16 is created on electronic referral application 30' in the cloud computing application 64 on the server network device 26.

At Step 134, additional referral credits are automatically applied to a predetermined number of target network devices 12, 14, 16 in the ranked list of referral credits with the electronic referral application 30' in the cloud computing application 64 on the server network device 26. For example, additional referral credits may be applied to the top target network devices in the ranked list, etc.

In one embodiment, Method 128 further includes Step 136, increasing automatically an amount of a referral credit for each addition referral credit recorded for a target network device. For example, an existing customer, patient or client may receive a $10 referral credit for the first five referrals, then a $25 referral credit for the next five referrals, then $50 referral credit for the next five referrals, etc. The increasing referral credit is used as an additional incentive for existing customers, patients or clients to refer as many new customer, patients or clients as possible. However, the present invention is not limited to this embodiment and other embodiments may also be used to practice the invention with of without Step 136.

The methods and systems described herein are described with respect to professional services. The method and systems described herein can also be applied to providers of goods of any type (e.g., books, groceries, automobiles, etc.).

The events in the methods and systems described herein happen in "real-time." In this context real-time are completed in a few seconds or less amount of elapsed time from the time the event is requested until the time it is completed.

The methods and systems described herein provide an electronic referral system via cloud computing with a cloud communications network using public networks, private networks, community networks and hybrid networks. The cloud communications network provides on-demand self-service, broad network access, resource pooling, rapid elasticity and measured electronic services for electronic referrals. The method and system dramatically improve an electronic referral infrastructure used by electronic referrers by providing electronic referral information using less bandwidth and less processing cycles via the cloud communications network than via a non-cloud communications network. Custom electronic referral systems are created by with QR bar codes and other types of bar codes and other types of custom information.

A method and system for creating electronic business referrals with cloud computing. Existing clients, customers or patient of a provider of professional services request a unique referral identifier tracking code (e.g., a unique QR code, etc.). The unique referral identifier tracking code is used by others as an automatic referral method to automatically schedule and appointment at a provider of the professional services, automatically record a referral discount for fee charged by the provider of the professional services and automatically record a referral credit for the existing client, customer or patient at provider of the professional services. The automatic referral method is completed with an electronic referral application in a cloud computing application when the unique referral identifier tracking code is received anywhere on a cloud computing network using less bandwidth and less processing cycles via the cloud communications network than via a non-cloud communications network.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for creating an electronic referral system with a cloud communications network, comprising:

receiving securely a request message including a plurality of electronic information from an application on a first target network device with one or more processors to create an referral entity on an electronic referral application in a cloud computing application on a server network device with one or more processors via a cloud communications network comprising a plurality of cooperating networks including a public communication network, and one or more private networks, one or more community networks and one or more hybrid networks, wherein a user of the first target network device is an existing customer, client or patient of a provider of professional services;

creating a unique referral identifier tracking code including a Quick Read (QR) bar code on the electronic referral application in the cloud computing application on the server network device using the plurality of electronic information from the request message;

creating an electronic referral entity on the electronic referral application in the cloud computing application on the server network device including a plurality of cloud services including a cloud software application including a cloud service for an electronic referral service, a cloud computing platform including a cloud service for the electronic referral service and a cloud computing infrastructure including a cloud service for electronic referral service, wherein the electronic referral entity including the plurality of cloud services uses less bandwidth and less processing cycles to provide the electronic referral service via the cloud communications network than via a non-cloud communications network;

sending securely the created electronic referral entity from the electronic referral application in the cloud computing application on the server network device back to the application on the first target network device via the cloud computing network;

generating automatically from the electronic referral application in the cloud computing application on the server network device on a printing device with one or more processors a plurality of non-electronic referral entities including the created unique electronic referral identifier for the first target network device;

providing automatically the created electronic referral entity from the first target network device to a plurality of other target network devices each with one or more processors via the cloud computing network, the plurality of other target network devices including a pre-determined association with the first target network device;

making the generated plurality of non-electronic referral entities available to a plurality of other entities associated with the first target network device; and receiving an individual created unique referral identifier tracking code from the created electronic referral entity scanned from one of the plurality of non-electronic referral entities from one of the plurality of other target network devices to automatically schedule an appointment at a provider of professional services and automatically record a referral discount for a fee charged by the provider of the professional services and automatically record a referral credit for the first target network device at provider of the professional services from the electronic referral application in the cloud computing application on the server network device when received from the one of the plurality of other target devices anywhere on any of the plurality of cooperating networks comprising the cloud computing network.

2. A non-transitory computer readable medium having stored therein a plurality of instructions for causing one or more processors on one or more network devices to execute the steps of:

receiving securely a request message including a plurality of electronic information from an application on a first target network device with one or more processors to create an referral entity on an electronic referral application in a cloud computing application on a server network device with one or more processors via a cloud communications network comprising a plurality of cooperating networks including a public communication network, and one or more private networks, one or more community networks and one or more hybrid networks, wherein a user of the first target network device is an existing customer, client or patient of a provider of professional services;

creating a unique referral identifier tracking code including a Quick Read (QR) bar code on the electronic referral application in the cloud computing application on the server network device using the plurality of electronic information from the request message;

creating an electronic referral entity on the electronic referral application in the cloud computing application on the server network device including a plurality of cloud services including a cloud software application including a cloud service for an electronic referral service, a cloud computing platform including a cloud service for the electronic referral service and a cloud computing infrastructure including a cloud service for electronic referral service, wherein the electronic referral entity including the plurality of cloud services uses less bandwidth and less processing cycles to provide the electronic referral service via the cloud communications network than via a non-cloud communications network;

sending securely the created electronic referral entity from the electronic referral application in the cloud computing application on the server network device back to the application on the first target network device via the cloud computing network;

generating automatically from the electronic referral application in the cloud computing application on the server network device on a printing device with one or more processors a plurality of non-electronic referral entities including the created unique electronic referral identifier for the first target network device;

providing automatically the created electronic referral entity from the first target network device to a plurality of other target network devices each with one or more processors via the cloud computing network, the plurality of other target network devices including a pre-determined association with the first target network device;

making the generated plurality of non-electronic referral entities available to a plurality of other entities associated with the first target network device; and receiving an individual created unique referral identifier tracking code from the created electronic referral entity scanned from one of the plurality of non-electronic referral entities from one of the plurality of other target network devices to automatically schedule an appointment at a provider of professional services and automatically record a referral discount for a fee charged by the provider of the professional services and automatically record a referral credit for the first target network device at provider of the professional services from the electronic referral application in the cloud computing application on the server network device when received from the one of the plurality of other target devices anywhere on any of the plurality of cooperating networks comprising the cloud computing network.

3. The method of claim 1 wherein the created unique referral identifier tracking code included includes a unique bar code.

4. The method of claim 3 wherein the created non-electronic referral entity includes a paper or plastic non-electronic referral entity.

5. The method of claim 1 wherein secure sending and receiving steps include using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or a Transport Layer Security (TLS) security method.

6. The method of claim 1 wherein the server network device includes a wireless networking interface for sending and receiving electronic information and messages comprising a Worldwide Interoperability for Microwave Access (WiMax) wireless networking interface with $4^{th}$ generation (4G) wireless speeds for communicating with the cloud communications network.

7. The method of claim 1 wherein the cloud communications network includes on-demand network access to a shared pool of configurable computing resources including public, private, hybrid and communication networks, cloud servers, cloud storage, cloud applications, and cloud services that are shared, rapidly provisioned and released with minimal management effort and cloud service provider interaction for the electronic referral services.

8. The method of claim 1 wherein the cloud communications network includes on-demand electronic referral services, broadband network access, resource pooling, rapid elasticity and measured network services for electronic referral services.

9. The method of claim 1 wherein the step of providing automatically the created electronic referral entity includes providing automatically the created electronic referral entity to one or more social networking sites.

10. The method of claim 1 wherein the application on the first target network device includes smart application for a smart phone or a tablet computer.

11. The method of claim 1 further comprising providing automatically the created electronic referral entity from the first target network device to a plurality of other servers network devices each with one or more processors via the cloud computing network.

12. The method of claim 11 wherein the created referral entity is displayed on a plurality of web-sites on the plurality of server network devices.

13. The method of claim 1 wherein the step of providing automatically the created electronic referral entity from the first target network device includes providing the created electronic referral entity from the first target network device in an electronic mail message, a text message or an instant message.

14. The method of claim 1 further comprising:
receiving securely a second request message from a second target network device with one or more processors on the electronic referral application in the cloud computing application on the server network device via the cloud communications network, wherein the second request message includes referral electronic information obtained from the unique electronic referral identifier code created for the first target network device;
sending securely and automatically from the electronic referral application in the cloud computing application on the server network device via the cloud communications network an electronic appointment information form to collect electronic appointment information from the second target network device to automatically schedule an appointment for the provider of professional services;
receiving securely on the electronic referral application in the cloud computing application on the server network device via the cloud communications network a completed electronic appointment information form from the second target network device;
automatically scheduling an appointment at the provider of the professional services on the electronic referral application in the cloud computing application on the server network device via the cloud communications network with the received completed electronic appointment information form;
automatically recording with the electronic referral application in the cloud computing application on the server network device a referral discount for the appointment scheduled for the second target network device, wherein the referral discount was included in the referral electronic information obtained from the unique electronic referral identifier code created for the first target network device received in the second request message; and
automatically recording with the electronic referral application in the cloud computing application on the server network device a referral credit for the appointment scheduled for the second target network device, wherein the referral credit was included in the referral electronic information obtained from the unique electronic referral identifier code created for the first target network device received in the second request message.

15. The method of claim 14 further comprising:
automatically generating a gift card or gift certificate or pre-paid debit card for an amount of the referral credit with the electronic referral application in the cloud computing application on the server network device.

16. The method of claim 1 further comprising:
automatically recording with the electronic referral application in the cloud computing application in a database associated with the server network device all referral credits for all appointment scheduled from all unique electronic referral identifier codes created for all target network devices;
creating automatically a ranked list of referral credits for the target network devices with the electronic referral application in the cloud computing application on the server network device; and
providing automatically additional referral credits to a predetermined number of target network devices in the ranked list of referral credits with the electronic referral application in the cloud computing application on the server network device.

17. The method of claim 16 further comprising:
increasing automatically an amount of a referral credit for each additional referral credit recorded for a target network device.

18. The method of claim 16 further comprising:
automatically generating a gift card or gift certificate or pre-paid debit card for an amount of the additional referral credits with the electronic referral application in the cloud computing application on the server network device.

19. The method of claim 1 wherein the professional services include medical services, dental services, legal services, accounting services, construction services and repair services.

20. A system for creating an electronic referral system with a cloud communications network, comprising in combination:

a non-transitory computer readable medium having stored therein a plurality of instructions for causing one or more processors on one or more network devices to execute a plurality of steps:

for receiving securely a request message including a plurality of electronic information from an application on a first target network device with one or more processors to create an referral entity on an electronic referral application in a cloud computing application on a server network device with one or more processors via a cloud communications network comprising a plurality of cooperating networks including a public communication network, and one or more private networks, one or more community networks and one or more hybrid networks, wherein a user of the first target network device is an existing customer, client or patient of a provider of professional services;

for creating a unique referral identifier tracking code including a Quick Read (QR) bar code on the electronic referral application in the cloud computing application on the server network device using the plurality of electronic information from the request message;

for creating an electronic referral entity on the electronic referral application in the cloud computing application on the server network device including a plurality of cloud services including a cloud software application including a cloud service for an electronic referral service, a cloud computing platform including a cloud service for the electronic referral service and a cloud computing infrastructure including a cloud service for electronic referral service, wherein the electronic referral entity including the plurality of cloud services uses less bandwidth and less processing cycles to provide the electronic referral service via the cloud communications network than via a non-cloud communications network;

for sending securely the created electronic referral entity from the electronic referral application in the cloud computing application on the server network device back to the application on the first target network device via the cloud computing network;

for generating automatically from the electronic referral application in the cloud computing application on the server network device on a printing device with one or more processors a plurality of non-electronic referral entities including the created unique electronic referral identifier for the first target network device;

for providing automatically the created electronic referral entity from the first target network device to a plurality of other target network devices each with one or more processors via the cloud computing network, the plurality of other target network devices including a pre-determined association with the first target network device;

for making the generated plurality of non-electronic referral entities available to a plurality of other entities associated with the first target network device;

for receiving an individual created unique referral identifier tracking code from the created electronic referral entity scanned from one of the plurality of non-electronic referral entities from one of the plurality of other target network devices to automatically schedule an appointment at a provider of professional services and automatically record a referral discount for a fee charged by the provider of the professional services and automatically record a referral credit for the first target network device at provider of the professional services from the electronic referral application in the cloud computing application on the server network device when received from the one of the plurality of other target devices anywhere on any of the plurality of cooperating networks comprising the cloud computing network;

for receiving securely a second request message from a second target network device with one or more processors on the electronic referral application in the cloud computing application on the server network device via the cloud communications network, wherein the second request message includes referral electronic information obtained from the unique electronic referral identifier code created for the first target network device;

for sending securely and automatically from the electronic referral application in the cloud computing application on the server network device via the cloud communications network an electronic appointment information form to collect electronic appointment information from the second target network device to automatically schedule an appointment for the provider of professional services;

for receiving securely on the electronic referral application in the cloud computing application on the server network device via the cloud communications network a completed electronic appointment information form from the second target network device;

for automatically scheduling an appointment at the provider of the professional services on the electronic referral application in the cloud computing application on the server network device via the cloud communications network with the received completed electronic appointment information form;

for automatically recording with the electronic referral application in the cloud computing application on the server network device a referral discount for the appointment scheduled for the second target network device, wherein the referral discount was included in the referral electronic information obtained from the unique electronic referral identifier code created for the first target network device received in the second request message;

for automatically recording with the electronic referral application in the cloud computing application on the server network device a referral credit for the appointment scheduled for the second target network device, wherein the referral credit was included in the referral electronic information obtained from the unique electronic referral identifier code created for the first target network device received in the second request message;

for automatically recording with the electronic referral application in the cloud computing application in a database associated with the server network device all referral credits for all appointment scheduled from all unique electronic referral identifier codes created for all target network devices;

for creating automatically a ranked list of referral credits for the target network devices; and providing automatically additional referral credits to a predetermined number of target network devices in the ranked list of referral credits.

* * * * *